United States Patent [19]

Stankosky et al.

[11] Patent Number: 4,725,301
[45] Date of Patent: Feb. 16, 1988

[54] SPOUT ASSEMBLY

[75] Inventors: Michael J. Stankosky, Windsor; John E. Suomala, Weatogue, both of Conn.

[73] Assignee: Emhart Industries, Inc., Farmington, Conn.

[21] Appl. No.: 921,721

[22] Filed: Oct. 22, 1986

[51] Int. Cl.⁴ .............................................. C03B 7/06
[52] U.S. Cl. .......................................... 65/327; 65/326
[58] Field of Search .......................... 65/325, 326, 327

[56] References Cited

U.S. PATENT DOCUMENTS 2,623,330 12/1952 Griffin ..................................... 65/327
2,990,649 7/1961 Huss ..................................... 65/327 X Primary Examiner—Arthur Kellogg
Attorney, Agent, or Firm—Spencer T. Smith

[57] ABSTRACT

A spout assembly for use in feeding gobs of molten glass to a glassware forming machine which includes a spout bowl, a plurality of burner blocks on top of the spout bowl and a plurality of cover blocks on top of the burner blocks. Adjacent ends of both the root blocks and burner blocks form a junction which has a jog therein to provide a baffle effect to prevent heat loss. The cover blocks also have a projection extending downward therefrom that taper downward and inwardly toward the axis of the spout bowl.

13 Claims, 9 Drawing Figures

SPOUT ASSEMBLY

BACKGROUND OF THE INVENTION

This invention relates to improvements in spout assemblies which are usable in connection with a feeder mechanism to feed gobs of molten glass to a glass forming machine.

In the process of making glass articles, the solid components of the glass batch are melted in a furnace and then passed through a forehearth which may consist of a rear or cooling section with means for both heating and cooling and a front section called the conditioning or equalizing section and which usually has means for heating only. At the end of the forehearth, there is usually a spout and feeder mechanism which together cooperate to form the molten glass into gobs for delivery to the glass forming machine.

The forehearth along with the spout and feeder mechanism function to take the glass from a melting furnace at whatever temperature is best for glass making and to deliver it to the forming machine as a uniformly consistent gob having the desired weight, shape and temperature and at a speed suited to the article being fabricated. The spout itself usually contains heating elements, either gas or electric, to maintain the glass at the proper temperature.

SUMMARY OF THE INVENTION

It is an object of the present invention to provide an improved spout configuration which helps maintain the molten glass therein at a homogenous temperature.

It is further object of the invention to provide a spout configuration wherein the heat loss of the glass through the spout refractory components is reduced.

It is a further object of the present invention to provide an improved spout configuration having improved thermal efficiency and reduced energy consumption.

These and other objects and advantages of the present invention may be accomplished through the provision of a spout assembly which includes a spout bowl, a plurality of burner blocks positioned on top of the spout bowl, and at least one cover block on top of the burner blocks covering at least a portion of the interior of the spout bowl. Each of the burner blocks may have at least one end forming a junction with an end of an adjacent burner block with the junction having a jog therein.

Another feature of the present invention includes the provision of a spout assembly including a spout bowl, at least one burner block positioned on top of the spout bowl, and at least one cover block on top of said burner block covering at least a portion of the interior of the spout bowl. The cover block may have a projection extending downwardly therefrom, the projection having an outer surface which tapers downwardly and inwardly and spaced from the internal wall of the burner block.

DETAILED DESCRIPTION

Figure 1:
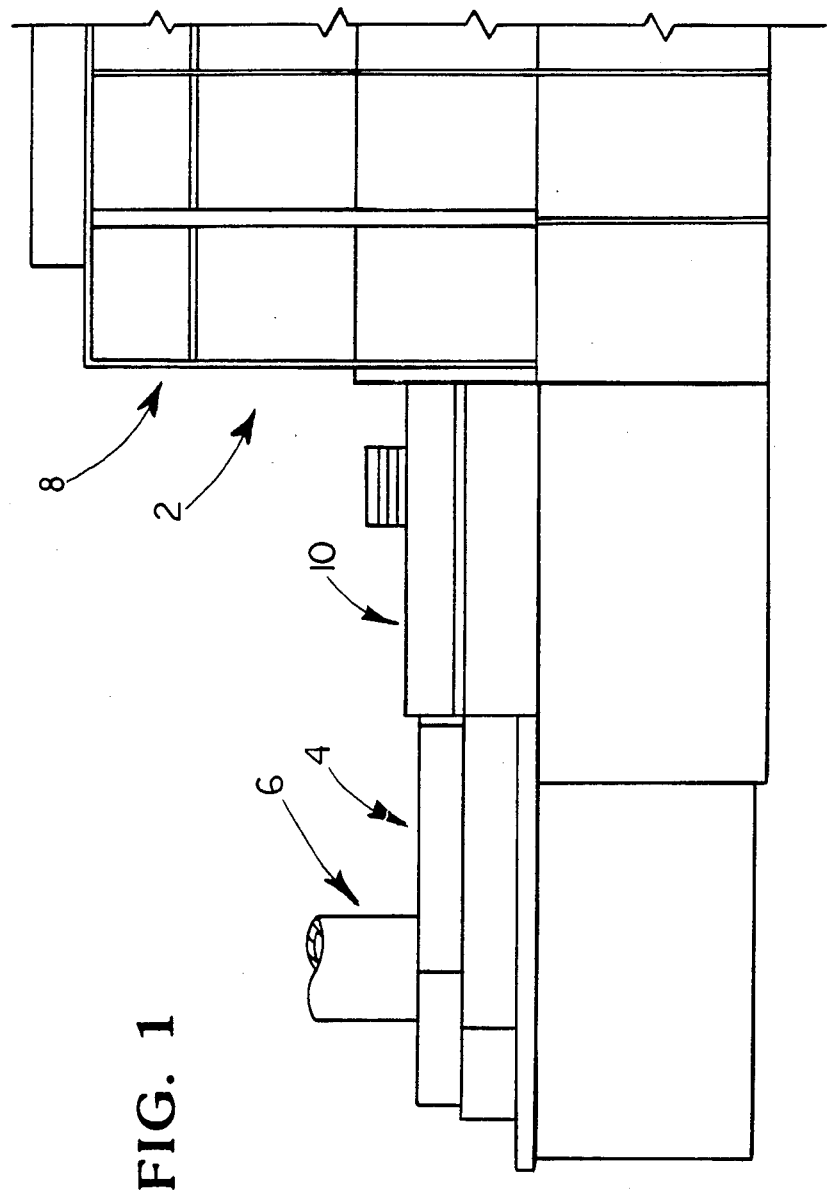
FIG. 1 is a vertical side view showing the general arrangement of a forehearth, spout and feeder mechanism.
Figure 2:
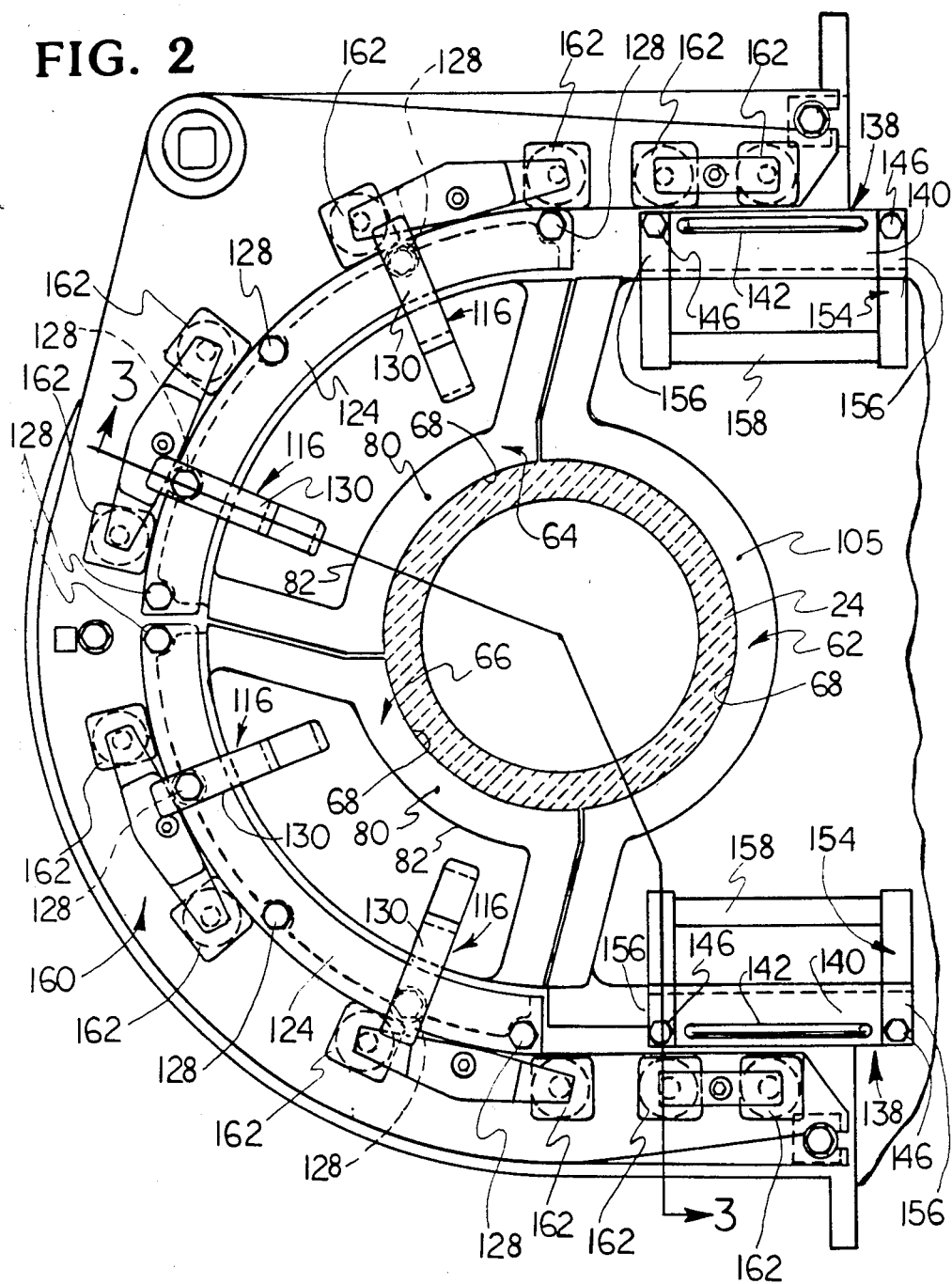
FIG. 2 is a horizontal plan view looking down upon the spout portion of the arrangement shown in FIG. 1.

Referring to the drawings, FIG. 1 shows a general arrangement for conveying molten glass from a furnace to a point where it is formed into a stream and cut by shears into gobs to be fed to a glass forming machine. This arrangement includes a forehearth 2, a spout assembly 4 and a feeder mechanism 6. The forehearth 2 may comprise a rear or cooling section 8 connected to a furnace (not shown) and which is usually outfitted with means positioned at various locations for both heating and cooling the stream of molten glass and a front section 10 called the conditioning or equalizing section and which usually includes only means for heating the stream of molten glass.

Figure 3:
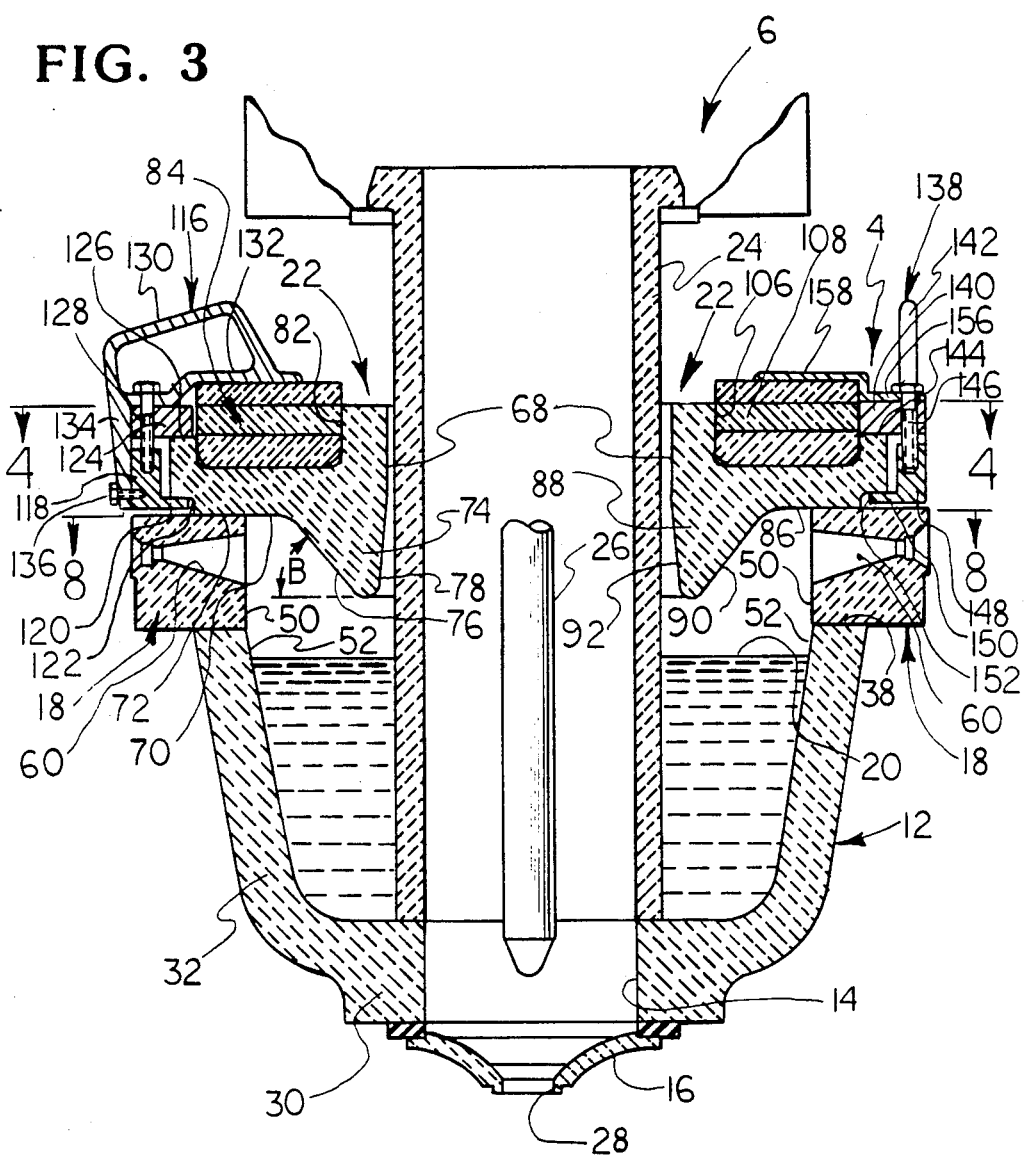
FIG. 3 is a vertical cross-section view taken along the lines 3—3 of FIG. 2.

The spout assembly 4 as shown in FIG. 3 may include a spout bowl 12 having a central orifice 14 in its bottom surface under which is positioned an orifice ring 16. Burner blocks 18 are positioned on top of the spout bowl 12 above the upper level of the glass or "metal line" 20. Cover blocks 22 are positioned on top of the burner blocks 18 and extend over the molten glass in the interior of the spout bowl 12.

The feeder mechanism 6, only partially shown in the drawings, may consist of a tube member 24 having an internal diameter substantially equal to the diameter of the orifice 14 in the spout bowl 12 and which is mounted by a suitable mechanism (not shown) for rotary motion and also for adjustment in a vertical direction. The feeder mechanism 6 may also include a plunger 26 which is reciprocated in a vertical direction by an appropriate mechanism (not shown). Both the tube 24 and plunger 26 are made from a suitable refractory material. The tube member 24 aids in controling the weight of the gob being formed and its rotation aids in the temperature equalization of the flowing glass. The plunger 26 cooperates with an orifice 28 in the orifice ring 16 to form the gobs of glass to be sheared by an appropriate shearing mechanism (not shown).

The spout bowl 12 includes a bottom portion 30 in which the orifice 14 is formed and a side portion 32. The side portion 32 is open at its rearward end to communicate with the forward open end of the forehearth 2. The side portion 32 of the spout bowl 12, in horizontal cross-section, includes a forward semi-circular portion 34 and two opposed straight portions 36 extending tangentially rearwardly from the semi-circular portion 34. The side portion 32 of spout bowl 12 has an upper flat surface 38 upon which the burner blocks 18 rest.

Figure 8:
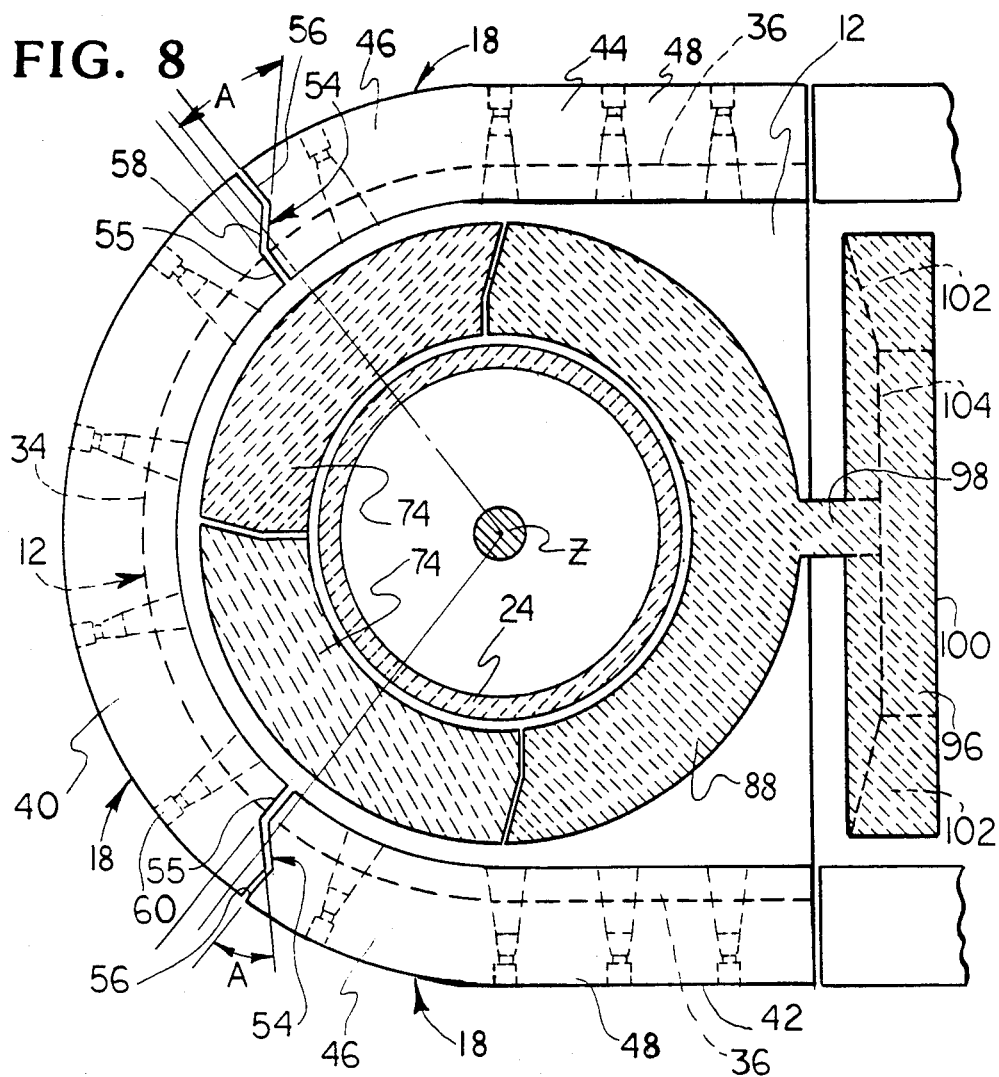
FIG. 8 is a sectional view taken along the lines 8—8 of FIG. 3.
Figure 9:
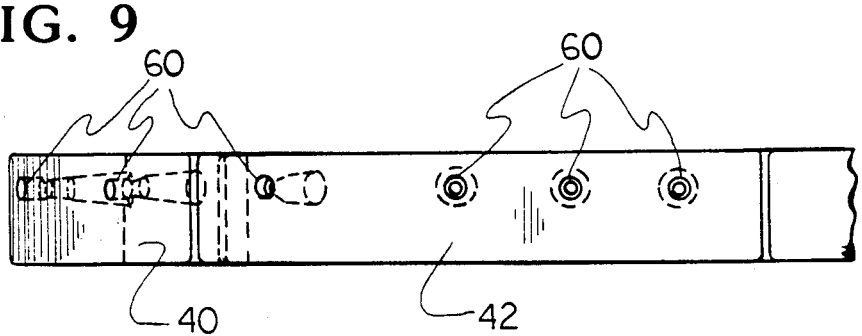
FIG. 9 is a side elevational view of FIG. 8.

The burner blocks 18, according to the preferred embodiment as shown in FIG. 8, comprise three individual blocks 40, 42 and 44. The front burner block 40 is generally in the form of a circular arc while each of the two side blocks 42 and 44 include an arcuate forward portion 46 and a generally straight rearward portion 48 extending rearwardly therefrom whereby each of the burner blocks 40, 42, 44, when assembled, conform to the horizontal shape of the spout bowl 12 with their inner surfaces 50 flush with the upper inner surfaces 52 of the spout bowl 12.

The adjacent ends of burner blocks 40, 42 and 40, 44 form a junction between adjacent blocks in which there is a jog 54 formed by the mating abuting ends of the respective burner blocks. The jog 54 may include an angle "A" ranging about 20 degrees to about 90 degrees. According to the preferred embodiment this angle is 45 degrees. The jog 54 is formed by providing the mating ends of each burner block with two offset inner and outer straight portions 55 and 56 respectively which are parallel to a radial line extending from the axis "Z" of the spout bowl 12 through the middle of the jog 54. The inner and outer straight portions 55 and 56 are connected by a straight middle portion 58 extending at the angle "A" thereto. Each of the burner blocks 40, 42, and 44 are provided with spaced burner openings 60 all lying in the same horizontal plane above the metal line 20 of the molten glass and which may be provided with suitable burners.

The cover blocks 22 as shown in particularly in FIGS. 4-7 include a rear block 62 and two identical forward blocks 64 and 66. The cover blocks 22 rest on the upper flat surface of the burner blocks 18 and extend inwardly over the molten glass in the interior of the spout bowl 12 to a point surrounding the tube 24. The inner side portions 68 of each of the cover blocks 62, 64 and 66 are generally arcuate in cross-section when the cover blocks 22 are assembled, forming a circle surrounding the tube 24 and slightly spaced therefrom.

As the two forward cover blocks 64 and 66 are identical, their specific structure will be described in connection with cover block 64 only. As will be noted particularly in FIGS. 3 and 7, the bottom surface 70 of the forward cover block 64 includes a generally horizontal outer portion 72 which rests on top of the burner blocks 18. A projection 74 extends downwardly from the bottom surface 70 at a point spaced radially inwardly from the inner surface 50 of the burner blocks 18. As will be noted in FIG. 3, this projection 74 extends downwardly so that it extends vertically below the axes of the burner openings 60 in the burner blocks 18 so that the heat emanating from the burner opening impinges upon the projection 74. The projection 74 may have an outer face 76 which may form an angle "B" with respect to a horizontal plane of about 20 degrees to about 80 degrees, thereby providing a face which slopes downwardly and inwardly toward the tube 24. In the preferred embodiment, this angle is approximately 50 degrees. The inner face 78 of the projection 74 forms a continuation of the inner side portion 68 of the cover blocks 64 and 66 and surrounds the tube 24 and is slightly spaced therefrom. The upper horizontal surface 80 of the each of the forward cover blocks 64 and 66 are provided with a cut out portion 82 in which layers of insulation 84 may be mounted as shown in FIG. 3. As will be noted, in a horizontal plane, each of the forward cover blocks 64 and 66 have a generally arcuate shape.

As shown particularly in FIGS. 4-8, the rear cover block 62 extends from one side of the burner blocks 18 to the other and includes a generally flat bottom portion 86 with the outside bottom edges thereof resting on the burner blocks 18 and a portion of the forehearth refractories. A projection 88, spaced inwardly from the inner surface 50 of the burner blocks 22, extends downwardly from the bottom surface of the rear cover block 62 in a manner similar to the projection 88 of the forward cover blocks. The projection 74 extends downward the same distance as the projections 74 of the forward cover blocks 64 and 66 to a point below the horizontal plane of the axes of the burner openings 60 in the burner blocks 18.

The projection 88 may have an outer face 90 sloping downwardly and inwardly toward the tube 24 forming an angle "C" with respect to a horizontal plane ranging from about 20 degrees to about 80 degrees. This angle may be the same as the angle of the outer face 76 of the projection 74 of the forward cover blocks 64 and 66 and in the preferred form is 50 degrees. The inner face 92 of the projection 88 forms a continuation of the inner side portion 68 of the rear cover block 62 which surrounds the tube 24 and is slightly spaced therefrom. As will be noted especially in FIGS. 7 and 8, when the cover blocks are assembled, the projection 88 of the rear cover block 62 along with the projections 74 of the forward cover blocks 64 and 66 form a circular projection in horizontal cross-section surrounding the tube 24 and spaced from the inner surface 50 of the burner blocks 22.

Figure 6:
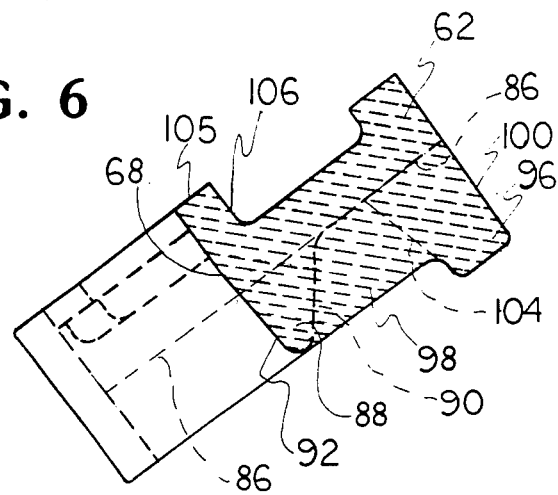
FIG. 6 is a transverse sectional view taken along the lines 6—6 of FIG. 4.
Figure 7:
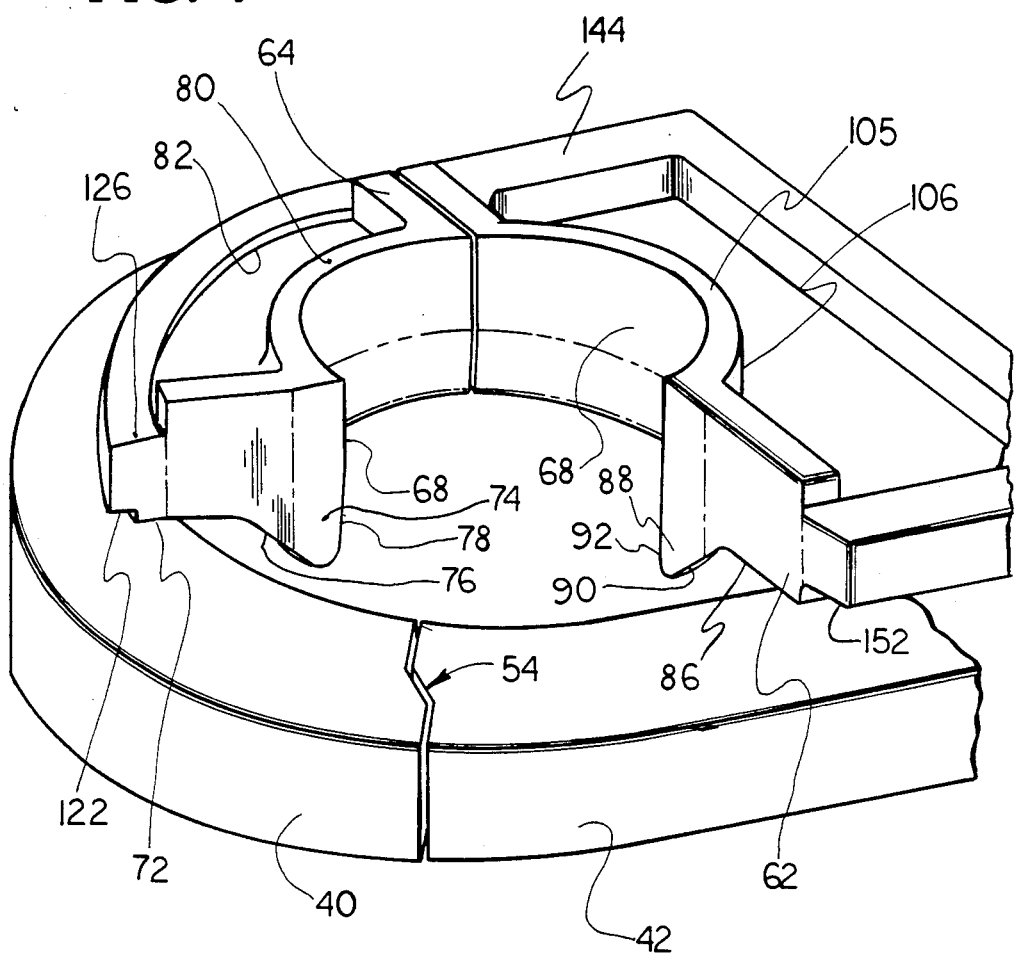
FIG. 7 is a perspective view showing the relationship of the cover blocks and the burner blocks.

As shown in FIGS. 6 and 8, the rear cover block 62 may also include a baffle portion 96 extending downwardly from its bottom portion 86 and which is interconnected with the projection 88 by a web 98. The baffle portion 96 actually extends downwardly into the forward end of the forehearth to a point vertically below the projection 88. The baffle portion 96 has a rearward straight side edge 100 and opposed side edges 102 which taper downwardly and inwardly toward each other. The forward side edge portion 104 tapers downwardly and rearwardly toward the rearward side edge 100. The baffle portion 96 serves to help maintain the temperature within the forehearth and prevent relative heat transfer between the forehearth and the spout. The upper surface 105 of the rear cover block 62 is similar to that of the forward cover blocks 64 and 66 in that it includes a cut out portion 106 in which layers of insulation 108 are mounted.

Figure 4:
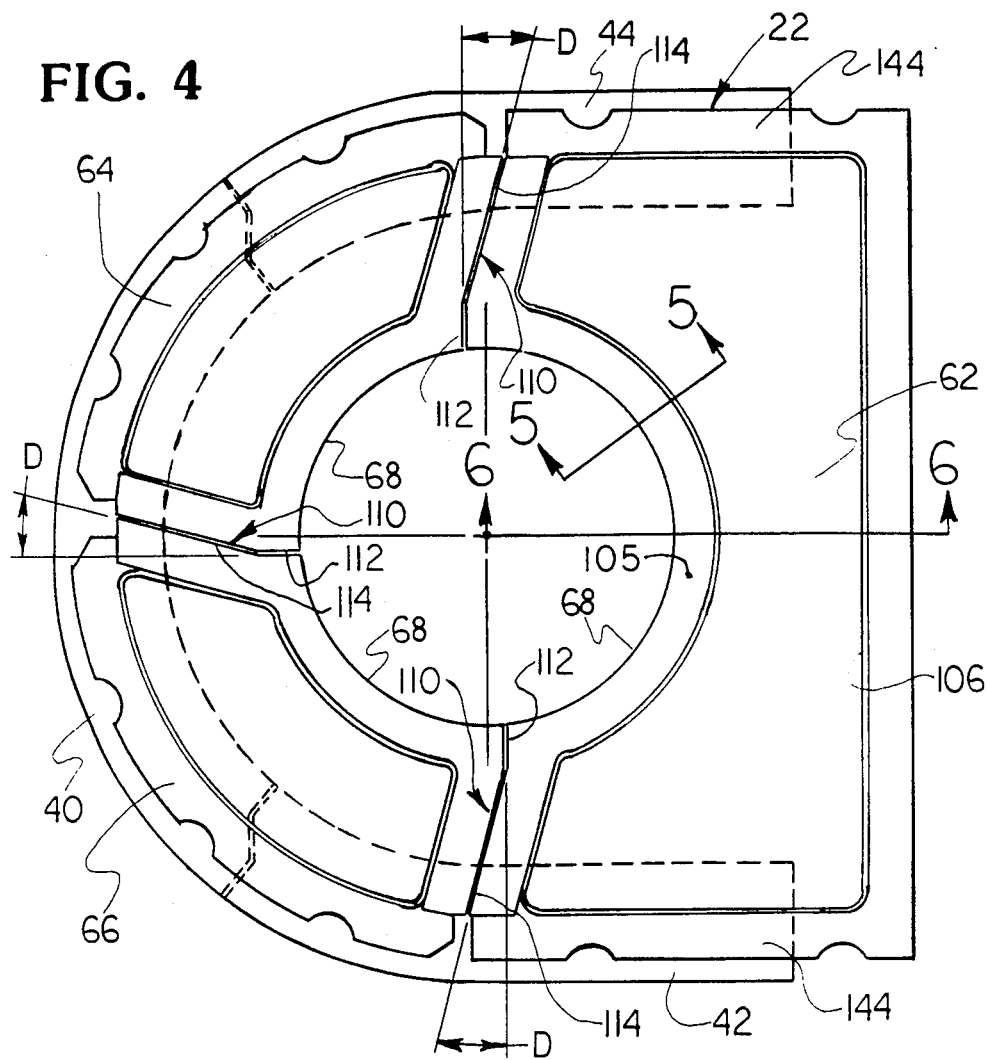
FIG. 4 is a transverse sectional view taken along the lines 4—4 of FIG. 3 with the support structure and feeder mechanism removed for clarity.
Figure 5:
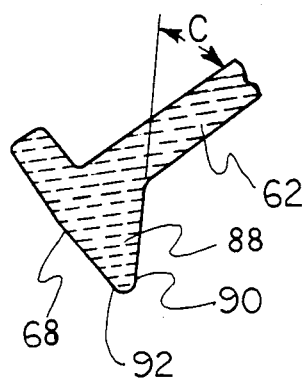
FIG. 5 is a transverse sectional view taken along the lines 5—5 of FIG. 4.

As shown particularly in FIG. 4, the adjacent ends of the cover blocks 62, 64 and 62, 66 form a junction between adjacent blocks in which there is a jog 110 formed by the mating abuting ends of the respective cover blocks. The jog 110 may include an angle "D" ranging from about 10 degrees to about 90 degrees with 15 degrees being preferred. The jog 110 is formed by providing the mating ends of each cover block with a first straight portion 112 and a second straight portion 114 extending at the angle "D" therefrom. The first straight portion 112 is parallel to a radial line extending from the axis "Z" of the spout bowl through the second straight portion 114.

The forward cover blocks 64 and 66 may each have a handle and clamping assembly 116 attached thereto which includes a metallic L-shaped member 118 having a flange portion 120 extending under an undercut portion 122 in the bottom surface 70 of the cover block and a metallic upper cover plate 124 which extends over a reduced outer portion 126 of the upper surface 80 of the cover block. The L-shaped member 118 and cover plate 124 are held together by screw members 128. Two spaced handles 130 are provided for each forward cover blocks 64 and 66. Each handle 130 has a flange portion 132 extending over top of the insulation 84 and a downwardly extended projection 134 which is positioned against the side of the L-shaped member 118.

Suitable screws 136 attach the downward extending projection 130 to the L-shaped member while one of the screw members 128 connecting the L-shaped member 118 with the cover plate 120 also extends through the flange portion 132 of the handle 130.

The rear cover block 62 has two opposed handle and clamping assemblies 138 attached thereto. Each assembly 138 includes an upper plate member 140 which extends over a reduced outer portion 144 of the upper surface 105 and which has a gripping handle 142 thereon. The plate member 140 is attached by means of screws 140 to an L-shaped member 148. The flange 150 of the L-shaped member 148 extends under an undercut portion 152 in the bottom portion 86 of the rear cover block 62. A clamping bracket 154 has one leg portion 156 attached to the plate member 140 by the screws 146 and a second leg portion 158 bearing down upon the top layer of the insulation 108 as shown in FIG. 3.

In a conventional matter, a burner manifold 160 may be positioned on top of a metal casing (not shown) which surrounds the spout bowl 12 and which contains insulation between the spout bowl 12 and the casing. The burner manifold 160 is connected to burners 162 associated with the respective burner orifices 60.

The burner blocks 18 and cover blocks 22 may be formed from a suitable refractory material. The provision of the jog in the junction between the mating ends of adjacent burner blocks and cover blocks provide a baffle to the escaping heat. The projection extending downwardly from the cover blocks directs the heat from the burners to the glass and provides radiant heat from the cover blocks to the glass and glass-spout bowl juncture. Also, the particular cover block design reduces the size of the chamber required to be heated.

While reference has been made above to a specific embodiment of present invention, it will be obvious to those skilled in the art that various modifications and alterations may be made with respect thereto. Accordingly, it is intended that the scope of this invention be ascertained from the following claims.

What is claimed is:

1. A spout assembly for use in feeding gobs of molten glass to a glassware forming machine, said assembly including a spout bowl, at least one burner block positioned on top of said spout bowl, and at least one cover block on top of said burner block covering at least a portion of the interior of the spout bowl, said cover block having a projection extending downwardly, said projection having an outer surface tapering downwardly and inwardly and spaced from the internal wall of said burner block.

2. The spout assembly of claim 1 wherein said at least one burner block has burner openings therein, said projection extending downwardly at least below the horizontal plane in which the axes of the burner openings lie.

3. The spout assembly of claim 2 wherein said surface of said projection has an angle of between about 20 degrees to about 80 degrees with respect to a horizontal plane passing therethrough.

4. The spout assembly of claim 1 wherein there are a plurality of cover blocks, each cover block having at least one end portion forming a junction with an adjacent end portion of another cover block, said junction having a jog therein.

5. The spout assembly of claim 4 wherein said junction includes a first straight portion and a second straight portion disposed at an angle with respect to said first portion.

6. The spout assembly of claim 5 wherein said angle is from about 10 degrees to about 90 degrees.

7. The spout assembly of claim 5 wherein said first straight portion is parallel to a radial line extending radially outwardly from the vertical axis of said spout bowl through said second straight portion.

8. The spout assembly of claim 1 wherein there are three cover blocks including a rear cover block extending from one side of said burner blocks to the other and two forward cover blocks extending inwardly over the interior of said spout bowl.

9. The spout assembly of claim 8 wherein each of said cover blocks an inner edge portion which define a circular opening having an axis which is coaxial with the axis of said spout bowl.

10. The spout assembly of claim 9 wherein said projection has an inner surface which is a continuation of the inner edge portion of each cover block.

11. The spout assembly of claim 10 wherein each cover block has a cutout portion in its upper surface and further including insulating means positioned within each of said cutout portions.

12. The spout assembly of claim 11 further including means associated with each of said cover blocks for clamping said insulation to said cover block and providing handle means for lifting said cover block.

13. The spout assembly according to claim 1 wherein there are a plurality of burner blocks positioned on top of said spout bowl and each of said burner blocks having burner openings therein, said projection extending downwardly at least below the horizontal plane in which the axes of the burner openings lie.

* * * * *